UNITED STATES PATENT OFFICE.

CHESTER B. DURYEA, OF CARDINAL, ONTARIO, CANADA.

PROCESS OF MAKING MALTOSE.

No. 916,685. Specification of Letters Patent. Patented March 30, 1909.

Application filed March 20, 1907. Serial No. 363,448.

*To all whom it may concern:*

Be it known that I, CHESTER B. DURYEA, a citizen of the United States, and resident of Cardinal, in the county of Grenville, Province of Ontario, Canada, have invented a new and useful Process of Manufacturing Maltose, of which the following is a specification.

My invention relates to a process of manufacturing maltose, with the object in view of producing a satisfactory product in a simple and efficient manner.

In my Patent No. 746933, granted to me on the 15th day of December, 1903, I described and claimed a process for the manufacture of maltose from modified starch.

My present invention consists in carrying the modification of the starch granules to such a degree that conversion of its highly concentrated paste or solution will take place promptly on the introduction of a very small percentage of diastatic agent, then adding a small percentage of such agent, for instance malt or malt extract, and subsequently separating and refining.

The above outlined procedure eliminates the step of cooking the modified starch paste with acid and still enables me to work with liquors at an initial gravity of 16° Baumé or above, a condition of great economy in practice.

The above indicated extreme modification of the starch granules further conduces to reduce the cost of conversion and to some degree the cost of refining as is more particularly set forth in my companion application Serial No. 363,449 filed of even date herewith.

This process may be carried out practically as follows:—The normal starch granules may be moistened with solutions of weakening agents without an excess of water. For instance, very weak hydrochloric acid and the granules so treated may be dried, preferably at elevated temperatures, the heat being preferably increased as the water evaporates, the time consumed depending upon the amount of heat, strength of acid and rate of drying, for example from forty-eight to seventy-two hours. The starch, at the conclusion of this step, is in, what is known in the art, as a highly modified or very thin boiling state. This thin boiling starch is made, by the addition of water, into a liquor of a density of 16° Baumé, or thereabout, and if found acid, the charge is neutralized by the introduction of some suitable neutralizing agent, as, for example, soda-ash, until the charge reacts neutral to lacmoid paper. The saccharification of the product is now proceeded with by the introduction of a small quantity of some suitable diastatic agent, for example malt or malt extract, in the proportions of about five pounds of the malt (dry basis) to one hundred pounds of the highly modified starch, the liquor having been preferably previously raised to the boiling point and cooled down to a suitable saccharification temperature of 59° C., for example. This raising to the boiling point and cooling down is not a necessary step as the modification might be carried so far as to obviate it, for example to such an extent as to render it completely convertible by the diastatic treatment. From this point, the syrup may be refined as follows:—The treatment with the malt is continued at about 58° C., for about sixty minutes. The mass of the liquor is then clear and when malt extract has been used as the diastatic agent, gluten, small amounts of cellular tissue from the original corn and fatty matters alone remain undissolved floating in the menstruum in the form of well defined flocks or clots, chiefly in the form of a blanket or scum. The mash is now briefly boiled a minute more or less to further separate coagulable proteids and is then filtered. This is not necessary but I have found in actual practice that it produces better separation and filtration. The mass is then treated with a coagulating agent, for example tannic acid, the latter introduced in the proportion of about one part of tannic acid to 4800 parts of finished syrup. The mass is then preferably heated to about 80° to 90° C., or may be boiled for a few minutes and again filtered. This heating is advantageous so far as the action of the char is concerned but is not absolutely necessary in forming the product as a lower degree of temperature, for example 70° C., will answer. A small amount of ground, well-tempered and washed bone-char is then added and kept well stirred in. After about thirty minutes of such treatment at about 80° C., the mass is again filtered and the product is complete unless it may be found desirable to further filtrate it for some purposes with or without a small amount of some suitable clarifying agent, for example, alumina cream, in order to make the removal of all particles of the bone-char or other suspended matters absolutely sure.

The refined product will be perfectly clear and brilliant and wholly free from objectionable odors, flavor or abnormal substances of any kind.

What I claim is:—

1. The process of manufacturing maltose consisting in first highly modifying the starch granules by drying them with acid incorporated therein, for example, 0.025% of hydrochloric acid; adding water to the highly modified starch to form a liquor of about 16° Baumé; neutralizing the charge, if acid, by the introduction of some neutralizing agent, such as soda-ash; introducing and treating with a diastatic agent, for example malt extract, in the proportion of about 5 lbs. of the malt (dry basis) to about 100 lbs. of the highly modified starch; treating the mass with a coagulating agent, for example tannic acid, in the proportion of about 1 part tannic acid to about 4800 parts finished syrup; introducing the bone char and finally filtering.

2. The process of manufacturing maltose consisting in first highly modifying the starch granules by drying them with acid incorporated therein; adding water to the highly modified starch to form a liquor of about 16° Baumé; neutralizing the charge, if acid; introducing and treating with a diastatic agent; treating the mass with a coagulating agent and subsequently refining and filtering, substantially as specified.

In testimony, that I claim the foregoing as my invention, I have signed my name in presence of two witnesses, this 15th day of March, 1907.

CHESTER B. DURYEA.

Witnesses:
 C. S. SUNDGREN.
 HENRY THIEME.